Sept. 10, 1963  R. G. BURTON  3,103,644
PLURAL CHANNEL TIME SHARING MULTIPLEX SYSTEM
Filed Feb. 26, 1960  2 Sheets-Sheet 2

INVENTOR.
ROBERT G. BURTON
BY Robert K. Schumacher
ATTORNEY

United States Patent Office
3,103,644
Patented Sept. 10, 1963

3,103,644
PLURAL CHANNEL TIME SHARING MULTIPLEX SYSTEM
Robert G. Burton, Tulsa, Okla., assignor to Well Surveys, Inc., a corporation of Delaware
Filed Feb. 26, 1960, Ser. No. 11,316
10 Claims. (Cl. 340—18)

This invention relates to well logging, and more particularly to a novel electronic system for use in conjunction therewith.

In the art of well logging, it is desirable to possess equipment which is capable of telemetering information on a number of subterranean characteristics to the surface. The information on the subsurface parameters which is thus derived helps to provide a more complete and readily understandable indication of the true geological character of the formations undergoing analysis.

The present invention teaches a system whereby it is possible to record data at the surface of the earth on a number of such subsurface variables. More particularly, the invention teaches novel electronic multiplex systems which make it possible for a number of subsurface detectors to ascertain the variation with depth of several subterranean properties, and transmit the information thus gathered to the surface for recording. In accomplishing this purpose, groups of plural-element space-discharge devices located in both the surface and the subsurface equipment are gated synchronously in order to transmit periodically information in each of a number of channels. Moreover, novel means are provided for insuring that the surface and subsurface systems remain in synchronism, and that each of the recorders situated at the earth's surface continues to record data on the same subsurface variable.

Accordingly, therefore, one primary object of the present invention is to teach a novel method and apparatus for obtaining data on the variation with depth of a plurality of subsurface properties.

Another object of the present invention is to teach an ingenious four channel electronic multiplex system for use in conducting well logging operations.

Another object of the present invention is to teach a novel switching and gating sequence for rendering active a plurality of normally inactive amplifier stages.

Still another object of this invention is to teach apparatus for causing surface and subsurface components of a plural channel multiplex system to lock-in and operate in synchronism.

A further object of the present invention is to provide a design for the circuitry and components of a system adapted for economically obtaining and recording data on a plurality of subsurface parameters.

Other and further objects of the present invention will become evident through inspection of the following detailed description and drawings in which like numerals indicate like parts and in which.

Figure 1:
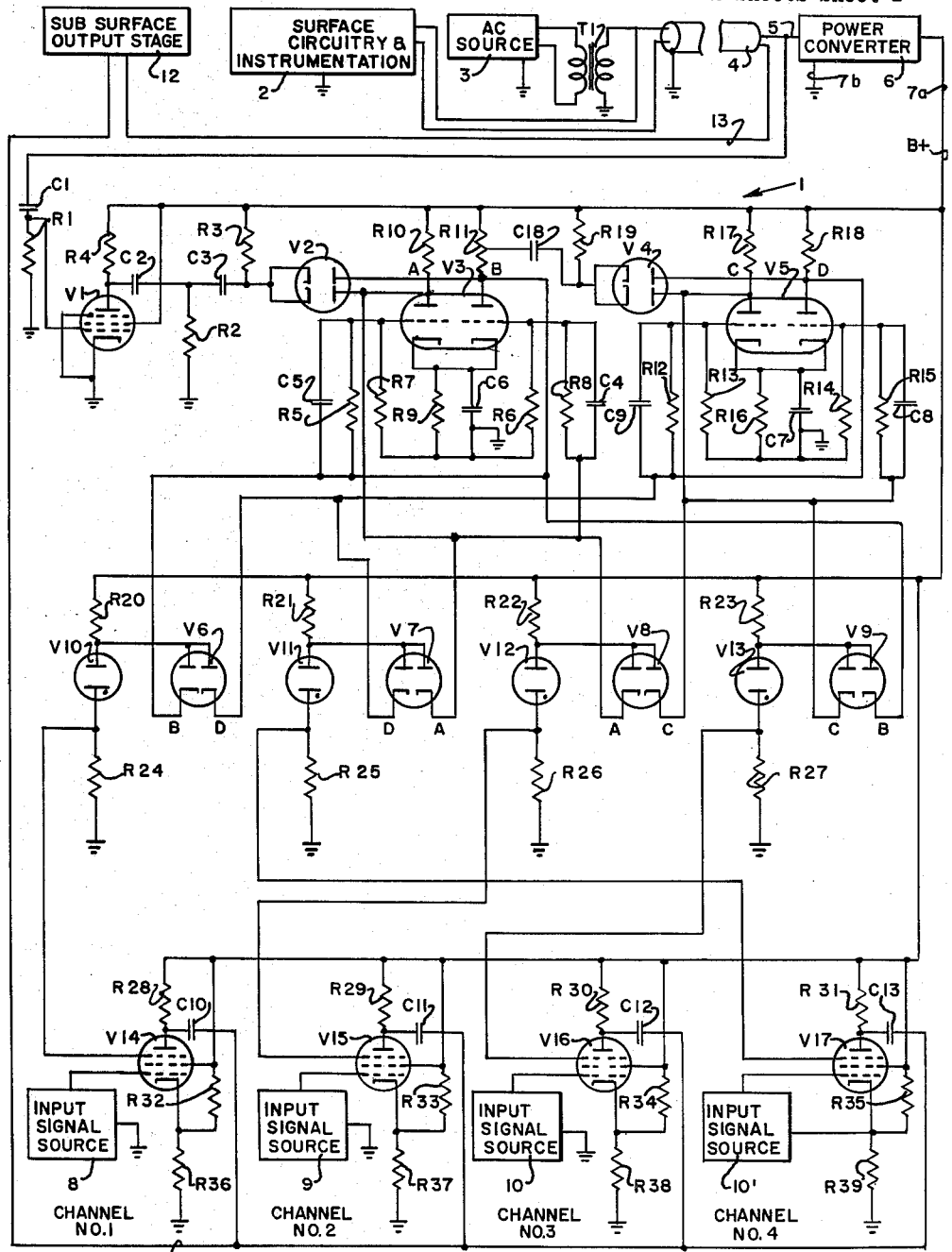
FIGURE 1 illustrates schematically the circuitry and components of a four channel subsurface system.

Turning now to the drawings, and more particularly to FIGURE 1 thereof, the numeral 1 indicates generally a multiplex well logging system which transmits data to the surface circuitry and instrumentation 2. Also provided is an alternating current source 3 which is connected, via transformer T1, to supply electrical power to the well logging cable 4.

The cable 4 includes a conductor 5 located therein for the purpose of conveying power down-hole. Within the subsurface instrument, a power converter 6 is connected to the lower end of conductor 5 to receive power therefrom. In practice, a 400 cycle per second alternating voltage, with a peak to peak magnitude of 100 volts is connected to conductor 5 as just described and yields acceptable results. The subsurface power converter 6 transforms, rectifies and filters the 400 cycle power and provides a regulated unidirectional output voltage. In general, any suitable circuit which will properly convert the oscillatory voltage into a substantially constant D.C. voltage is satisfactory, and it is desired not to limit the invention to any particular form of power converter.

As seen in FIGURE 1, the subsurface power converter 6 is provided with output terminals 7a and 7b, the latter of which is connected to ground potential. Terminal 7a comprises a B-plus or anode potential source and is coupled to the anodes of the various tubes shown in FIGURE 1 through suitable anode load resistors. Each of the tubes in FIGURE 1 is also provided with a suitable supply of filament power from the power converter 6 by conventional means not shown.

The 400 cycle alternating voltage which is supplied down-hole over conductor 5 is coupled via capacitor C1 to the control grid of tube V1. The control grid is connected to ground through resistor R1. The tube V1 may comprise a conventional 6AS6 pentode tube connected to operate as a rectifier and pulse shaper in conjunction with the anode load network which comprises resistor R4, capacitor C2 and resistor R2. The anode of tube V1 is connected to B-plus through resistor R4. In general, the application of the successive cycles of 400 cycle alternating voltage to the pentode V1 results in the development of a succession of voltage pulses across the resistor R2. These voltage pulses are coupled, via capacitor C3, to the common cathode of dual diode V2. It will be observed that the common cathode of the tube V2 is coupled to B-plus potential through resistor R3.

In FIGURE 1, a first bistable multivibrator, or flip flop circuit, is shown to the right of dual diode V2 and is connected to respond to conduction in this tube. The first multivibrator employs the dual triode V3. The left hand anode of tube V3 is coupled to the right hand control grid via resistor R8; conversely, the right hand anode of tube V3 is coupled to the left hand control grid via resistor R5. Capacitors C4 and C5 are connected in parallel, with the resistors R8 and R5, respectively. The right and left hand control grids of tube V3 are coupled to ground through resistors R6 and R7, respectively, and the common cathode is grounded through the parallel connected resistor R9 and capacitor C6. Anode potential is applied to the left and right anodes of tube V3 through the plate load resistors R10 and R11, respectively. Moreover, each of the anode elements of the dual diode V2 is connected to a respective anode of the dual triode V3.

Somewhat to the right of tube V3 in FIGURE 1, the dual triode V5 is connected as a bistable multivibrator in a manner similar to that shown for the tube V3. More particularly, the left hand anode of tube V5 is coupled through resistor R15 to the right hand control grid. The right hand anode is connected, via resistor R12, to the left hand control grid. The common cathode is connected to ground through resistor R16 and capacitor C7 connected in parallel. The left and right control grids are grounded through resistors R13 and R14, respectively, and the capacitors C8 and C9 are connected in shunt across resistors R15 and R12, respectively. Anode potential is applied to the left and right anodes of the tube V5, through individual anode load resistors R17 and R18.

The bistable multivibrator which employs the dual triode V5 is responsive to the conduction intervals in dual triode V3. The plate load resistor R11 of tube V3 is tapped, and the connection at the tap joint is coupled to the common cathode of the dual diode V4 through capacitor C18.

The common cathode of dual diode V4 is coupled to B-plus anode potential through resistor R19. Moreover, each of the anode elements of tube V4 is coupled to a respective anode of the dual triode V5. In order to expedite the subsequent detailed description of the switching sequence the left and right anodes of the dual triodes V3 and V5 have been designated by the letters A, B, C and D, as shown clearly in the schematic diagram.

Continuing now with the detailed description of FIGURE 1, a group of dual diodes V6, V7, V8 and V9 is shown below the bistable multivibrator units and is connected to become conductive in accordance with the switching sequence thereof. The common anode elements of the dual diodes V6, V7, V8 and V9 are connected to the B-plus voltage supply through plate load resistors R20, R21, R22 and R23, respectively, as shown.

The common anode elements of tube V6 are isolated from ground by tube V10 and resistor R24 connected in series. In like manner, the common anode elements of dual diode V7 are isolated from ground by tube V11 and resistor R25; both anodes of tube V8 are coupled through tube V12 and resistor R26 to ground, and both anodes of tube V9 are connected to ground through tube V13 and resistor R27 in series.

The tubes V10, V11, V12 and V13 may each comprise a gaseous discharge device of the type characterized by a predetermined breakdown voltage. In the embodiment shown in FIGURE 1, neon filled tubes with a breakdown voltage of approximately 65 volts were found to operate satisfactorily. At or about 65 volts, the gas in such tubes ionizes and provides a conductive path therethrough.

The left side cathode of tube V6 and the right side cathode of tube V9 are directly connected to the right anode B of the dual triode V3; the right cathode of V6 and the left cathode of V7 are coupled to the right anode D of dual triode V5. Additionally, the left anode A of dual triode V3 is connected in common with right cathode of V7 and the left cathode of V8. Finally, the left anode C of dual triode V5 is connected in common with the right cathode of V8 and the left cathode of V9.

Below the dual diodes V6, V7, V8 and V9 depicted in FIGURE 1, there is shown a plurality of plural element space discharge devices V14, V15, V16 and V17. In this embodiment of the invention, the use of 6AS6 pentode tubes for such space discharge devices has furnished satisfactory results. The B-plus anode potential is applied to the anode elements of the pentodes V14, V15, V16 and V17 through plate load resistors R28, R29, R30 and R31, respectively. The suppressor grids of the pentodes V14, V15, V16 and V17 are connected to the ungrounded ends of resistors R24, R26, R27 and R25, respectively. A positive rectangular voltage pulse occurs across each of these resistors when both halves of the associated dual diodes V6, V7, V8 and V9 are non-conducting. As will be explained more fully below, only one such dual diode can be in this state at any one time, and there is thus provided a series of positive gate pulses for rendering the tubes V14, V15, V16 and V17 conductive in sequence. More particularly, each positive gate pulse is applied to the suppressor grid of one of the normally non-conductive pentodes shown below the dual diodes, and acts to "turn it on." It will be noted that the positive pulses from resistors R24, R25, R26 and R27 are applied to the suppressor grids of pentodes V14, V17, V15 and V16, respectively. Electrical signals transmitted during the conduction periods of the pentodes V14, V15, V16 and V17 are referred to in this specification as occurring in Channel No. 1, Channel No. 2, Channel No. 3 and Channel No. 4, respectively. To clarify and expedite the detailed description, the respective channels have been designated upon the drawing of FIGURE 1 by suitable legends.

Referring further to the bank of pentodes V14, V15, V16 and V17, the screen grid electrodes of these tubes are maintained at B-plus potential, as shown, and are each coupled, via resistors R32, R33, R34 and R35, respectively, to the respective cathode electrode. The individual common junctions between the cathodes of V14, V15, V16 and V17 and the resistors R32, R33, R34 and R35 are coupled to ground, via resistors R36, R37, R38 and R39, respectively.

The control grids of tubes V14, V15, V16 and V17 are connected to input signal sources 8, 9, 10 and 10', respectively. The input signal sources 8, 9, 10, 10' may each comprise a suitable radioactivity detector which responds to the presence of incident subsurface radiation by producing a series of discrete electrical pulses. A Geiger counter, or a scintillation crystal used in conjunction with a photomultiplier tube, yields excellent results when used for this purpose. With this type of detector, there may be included suitable circuitry for integrating such pulses in order to yield a D.C. voltage with a magnitude directly proportional to the average repetition rate of the pulses. With a time constant of (say) one second, or less, for the integration, a slowly varying unidirectional output voltage from the integrating circuit may be applied to the control grid of one of the pentodes. For instance, the input signal source 8 of Channel No. 1 may comprise a signal which reflects subsurface gamma ray radiation, and the input signal source 9 for Channel No. 2 may comprise a voltage signal which reflects subsurface neutron radiation.

If desired, continuous current radioactivity detectors, such as conventional ionization chambers or the like may be employed with appropriate circuitry as input signal sources for any or all of the various channels. Alternatively, any other subsurface variable of interest such as resistivity, salinity, temperature, or the like may be sampled and applied in the form of an electrical voltage to the control grids of the pentodes V14, V15, V16 and V17.

Since the greatest utility of the present invention lies in its ability to transmit a large number of independent channels of information over a cable of limited band width, the particular subsurface variables of interest, and the specific method of detecting them are not critical. While the use of the plural channel system for conveying quantitative data on subsurface radiation has been described above, as a concrete example, it will nevertheless be understood that the invention is by no means limited thereto.

Continuing now with the detailed description of FIGURE 1, the anode elements of each of the pentodes V14, V15, V16 and V17 are respectively coupled to the outgoing signal bus 11 by means of the capacitors C10, C11, C12 and C13. Since only one of the pentodes conducts at one time, the use of a single conductor to convey the output signals is obviously sufficient.

The outgoing signal bus 11 is connected to the subsurface output stage 12. The output stage 12 may include a circuit such as a cathode follower, for providing a proper match between the impedance of the cable and that of the subsurface circuitry. Where such a circuit is used with a suitable clamping circuit, the direct application of the output signal voltages to conductor 13 is possible.

Or, if single conductor operation is desired, the subsurface output stage 12 may include an oscillator which provides an electrical carrier frequency. This carrier frequency may be either amplitude or frequency modulated by the pulses which are conveyed over the signal bus 11. For such single conductor operations, the signal on line 11 may be used to amplitude or frequency modulate the oscillator within the output stage 12. Thus, the use of conductor 13 may again be eliminated, and the modulated output of stage 12 coupled directly to conductor 5 for transmission uphole. In this type of operation, as will be understood by those skilled in the art, it is necessary to operate the oscillator within stage 12 at a frequency which is sufficiently remote from that supplied by the high frequency source 3 to prevent interference. It is contemplated that conventional circuitry and components may be employed within the output stage 12 for accomplishing the required impedance matching, or for generating and modulating the desired carrier frequency. Accordingly, no claim is made to the particular configuration of the systems within the stage 12.

At the surface, the electrical signals conveyed uphole over cable 4 are applied to the surface circuitry and instrumentation indicated by the numeral 2.

Since the subsurface pentodes V14, V15, V16 and V17 conduct sequentially, in order to cyclically transmit the information in the four channels, it will be appreciated that there must be provided suitable surface circuitry in which corresponding channels become receptive in the identical sequence. The circuits which periodically gate the surface channels in synchronism with the subsurface channels are contained within the surface circuitry and instrumentation designated by the numeral 2, and will be explained in detail in connection with FIGURE 2a of this specification. Where a carrier frequency has been generated and modulated within subsurface output stage 12 and conveyed uphole via conductor 5, conventional circuits for demodulating the carrier frequency may be employed within the surface circuitry and instrumentation.

METHOD OF OPERATION OF FIGURE 1

Turning now from the description of the connections of FIGURE 1 to the switching sequence and operation thereof, dual triodes V3 and V5 are each connected as bistable multivibrators. As will be appreciated by those skilled in the art, each of these tubes is characterized during any given interval by full conduction through one triode-section, and substantially complete non-conduction through the other triode-section. However, an appropriate triggering signal quickly causes a reversal of this condition. Such bistable multivibrators are also known as "flip-flops." In FIGURE 1, it will be assumed that the left hand sections of dual triodes V3 and V5 are both conductive and draw current in the initial assumed condition.

In this condition, the right hand sections of tubes V3 and V5 are each non-conductive. Hence, no plate current flows through the plate load resistors R11 and R18, and a potential close to B-plus exists on the right hand anodes designated by the letters B and D, respectively. Conversely, because of the conduction through the left hand sections of tubes V3 and V5, the potential at anodes A and C is below the value of B-plus potential by amounts equal to the voltage drops across resistors R10 and R17, respectively.

The initial condition persists until the arrival of the next positive half cycle of voltage supplied by A.C. source 3, via conductor 5. The pentode V1 operates in a conventional manner to produce a switching trigger pulse across resistor R2 in response thereto.

The switching trigger pulse developed across resistor R2 is coupled through capacitor C3 to the common cathode of dual diode V2. The cathode potential of dual diode V2 is thereby depressed below that of the particular dual diode anode B. The resultant current which flows between this anode of V2 and the common cathode is drawn through resistor R11, the plate load resistor for the right triode-section of V3. This, in a conventional manner, institutes full conduction through the right triode-section of V3, and interrupts conduction through the left triode-section of V3. The resultant voltage drop across plate load resistor R11 depresses the cathode potential of dual diode V4. Accordingly, the anode D of V4 draws current through the plate load resistor R18. This, of course, is because anode D was previously non-conductive and temporarily enjoyed B-plus potential. It will thus be seen that the first pulse from tube V1 after the assumed initial condition, switched both dual triodes from left side conduction to right side conduction.

The next positive pulse developed across resistor R2 will depress the cathode potential of V2 below that of the anode connected to point A on dual triode V3. The current drawn by this anode of the dual diode must flow through the plate load resistor R10. This initiates full conduction in the left triode-section of V3 and terminates conduction in the right triode-section of the tube. The resultant loss of current flow in the plate load resistor R11 reapplies B-plus potential to point B. During this time, no transient has occurred to shift conduction in V5 from the right triode-section to the left triode-section. Thus, the second positive pulse after the assumed initial conditions has switched conduction in tube V3, but has not done so in tube V5.

Upon receipt of the next positive pulse, which constitutes the third pulse delivered after the assumed initial condition, the reduction in the cathode potential applied to dual diode V2 causes a current flow therethrough. This current is again drawn through the plate load resistor R11, which forces the conduction to shift from the left to the right triode-section of V3. The consequent diminution in the cathode potential of dual diode V4 causes it to draw current through plate load resistor R17. This causes conduction in dual triode V5 to shift from the right to the left triode section thereof.

The arrival of the next impulse, which is the fourth trigger pulse delivered in the sequence, causes diode V2 to draw current through resistor R10, and returns the conduction to the left hand triode-section of V3. Conversely, the diode V4 draws no current and there is no shift in conduction to the right triode section of V5. Thus, the arrival of four successive trigger pulses has returned both bistable multivibrators to the original assumed condition. As will be understood by those skilled in the art, the arrival of four successive pulses will return the multivibrators to any assumed set of initial conditions.

To expedite the discussion of the invention the following tabular schedule of the conductive intervals is set forth.

*Conducting Anodes of Subsurface Multivibrators*

| | | | | |
|---|---|---|---|---|
| Original Assumed Conditions | A | | C | |
| First Pulse | | B | | D |
| Second Pulse | A | | | D |
| Third Pulse | | B | C | |
| Fourth Pulse | A | | C | |

Referring again to FIGURE 1, it will be noticed that the anodes of each of the dual diodes V6, V7, V8 and V9 are supplied B-plus potential. It will be appreciated that the individual diode sections in each such tube can conduct only when the cathode thereof is maintained negative with respect to the anode.

Moreover, it will be noted that during an interval when a dual diode, such as V6, for example, is non-conductive on both individual diode-sections, the B-plus potential applied through resistor R20 to the gaseous diode V10 will cause the tube to ionize. This causes the diode V10 to couple a positive voltage to the suppressor grid of the normally non-conductive pentode V14 and initiate conduction therethrough. It should be appreciated in this connection that as soon as conduction occurs in either of the diode-sections of a tube, such as V6, the potential available at the anode of the associated gas diode V10 is insufficient to maintain the tube in an ionized condition and the tube, therefore, extinguishes. This completely isolates the suppressor grid of V14, from the positive potential, and grounds it through resistor R24. Accordingly no current will flow in pentode V14 except during those periods when the suppressor grid thereof is rendered positive as a result of the ionization of the gaseous diode V10. And, as earlier explained, such ionization occurs only during the intervals of complete non-conduction in the dual diode V6. The manner in which only one of such diodes is allowed to remain non-conductive at a time, in order to gate the pentodes V14, V15, V16 and V17 in sequence will now be explained.

In the original assumed condition for the bistable multivibrators which employ dual triodes V3 and V5, conduction in the left hand triode sections of each tube was assumed. As a result, the full B-plus potential from the terminal 7a is applied to the anodes of the right-hand triode sections of V3 and V5. These are designated by the letters B and D, respectively. The left hand cathode of dual diode V6 is connected directly to anode B of tube V3, and the right hand cathode of tube V6 is connected to anode D of tube V5. Since all elements of tube V6 are thus maintained at the same potential, no current can flow. As a result, the tube V10 ionizes and applies positive potential to the suppressor grid of pentode V14. Accordingly, the voltage signals from input signal source 8 are applied to the grid of V14, to change the conductivity thereof, and the resultant signal is coupled, via capacitor C10 to the outgoing signal bus 11. At least one cathode of dual diodes V7, V8 and V9 is connected to anodes A or C, rendering these diodes conducting and preventing the flow of current in tubes V11, V12 and V13. Thus only pentode V14 of Channel No. 1 is conductive under these conditions.

When the first pulse after the initial assumed condition occurs, the dual triodes V3 and V5 each switch from conduction in the left triode section to conduction in the right triode section, as shown in the tabular schedule of conductivities above provided. This, of course, places the full B-plus potential on the anodes A and C of the respective dual triodes.

The left hand cathode of dual diode V8 is coupled directly to the anode A of tube V3, and the right hand anode of V8 is coupled directly to anode C of tube V5. Since every element of dual diode V8 is now at B-plus potential, current flow through the tube is impossible. Accordingly, the gaseous diode V12 ionizes and connects positive voltage to the suppressor grid of V15, the Channel No. 2 pentode.

During this interval, the anodes B and D constitute the conductive anodes of tubes V3 and V5, respectively, and are less than B-plus by the value of the voltage drop across their respective load resistors. Dual diodes V6 and V9 each have a cathode coupled to this reduced potential at anode B, and dual diode V7 has a cathode connected to anode D. This causes conduction in the diodes V6, V9 and V7. Accordingly, the gaseous diodes V10, V13 and V11 are not ionized, and pentodes V14, V16 and V17 are in their normally non-conductive state. Thus, only diode V8 is completely non-conductive, and only the pentode V15 in Channel No. 2 is conductive during this interval.

When the second pulse after the original assumed conditions occurs, the tube V3 switches from conduction in the right hand triode section to conduction in the left hand triode section. Tube V5 remains conductive in the right hand triode section, as explained earlier. Hence, the anodes A and D now form the conductive anodes, and the anodes B and C are each directly connected through their respective plate load resistors to B-plus potential. The left and right cathodes of duel diode V9 are connected, respectively, to the anodes C and B. This places both V9 cathodes at the same potential as the V9 anodes and effectively prevents conduction. Accordingly, the gaseous diode V13 ionizes and connects a positive potential through to the suppressor grid of pentode V16. The pentode V16, it will be observed, transmits a signal in Channel No. 3 during its conductive intervals. The output signal from pentode V16 is coupled, via capacitor C12, to the outgoing signal bus 11. During the interval herein described, anodes A and D are conductive, and the potentials existing thereat are less than B-plus by the voltage drop across the plate load resistors R10 and R13, respectively. Since a cathode of each dual diode V7 and V8 is coupled directly to anode A, and one cathode of V6 is coupled directly to anode D, the dual diodes V6, V7 and V8 become conductive. This, of course, prevents the ionization of gas diodes V10, V11 and V12, respectively, and keeps the pentodes V14, V15 and V17 cut off. Hence, during the interval which follows receipt of the second pulse after the original assumed conditions, only dual diode V9 is completely non-conductive and only pentode V16 in Channel No. 3 is conductive and able to provide a signal to outgoing signal bus 11.

When the third pulse after the original assumed condition actuates the circuits of FIGURE 1, the dual triode V3 is switched to conduction in the right hand triode section, and the dual triode V5 is switched to conduction in the left hand triode section. Accordingly, substantially full B-plus potential exists at the non-conductive anodes A and D, and a voltage lower than B-plus exists at anode B and C.

Since the left and right cathodes of dual diode V7 are connected, respectively, to the non-conductive anodes A and D, B-plus potential is present on all elements of this dual diode, and conduction is prevented. Consequently, the gaseous diode V11 ionizes and connects a positive voltage to the suppressor grid of V17, the Channel No. 4 pentode. Signals applied to and amplified by pentode V17 are coupled to the outgoing signal bus 11, via capacitor C13, for transmission to the subsurface output stage 12.

During this interval, a cathode of dual diode V6 and a cathode of dual diode V8 are connected to the less than B-plus voltage which exists at anodes B and C, respectively. The left and right cathodes of dual diode V9 are also connected respectively, to the conductive anodes C and B. Consequently, dual diodes V6, V8 and V9 are each provided with a sufficiently negative cathode potential to permit conduction therethrough.

It will be observed that in the interval which follows receipt of the third pulse, tube V7 is the only completely non-conductive dual diode, and tube V17 in Channel No. 4 is the only conductive pentode which is able to provide an output signal for delivery to the outgoing signal bus 11.

It will be noted in this connection that the pentode V17 is connected in such a manner that a constant fixed voltage is added to the input signal so that the output signal appearing at the anode always has a minimum value which exceeds the maximum value of any output signal at any of the other gate tube anodes. By this means the output signal from Channel 4 gate tube is always different, that is, larger than any other output signal from any other channel and so may be used for channel identification and hence synchronization of subsurface and surface sequencing units. In general, the proportioning of the circuit constants or adjustment of the input signal strengths to insure that the magnitude of the synchronizing pulse exceeds that of the output pulses of the other channels is conventional, and may readily be accomplished by one skilled in the art.

When the fourth pulse after the original assumed conditions actuates the downhole circuitry depicted in FIGURE 1, the tubes V3 and V5 which are employed in the respective bistable multivibrator units revert to the original assumed condition. Conduction in dual triode V3 shifts to the left triode section and dual triode V5 remains conductive in the left triode section thereof as before. The circuit, as a 4 channel system, has been switched through four successive states and has cyclically transmitted information in four separated channels. Receipt of the fourth pulse after the original assumed condition has returned the system to Channel No. 1. In other words, the cathodes of dual diode V6 have been coupled to the B-plus potential existing at non-conducting anodes B and D, the gas diode V10 has been ionized, and positive potential is now connected through to the suppressor grid of pentode V14. Hence, subsurface data from the detecting means within input signal source 8 is permitted to travel uphole via pentode V14 and outgoing signal bus 11, for recordation in Channel No. 1. As earlier mentioned, the data which is coupled to outgoing signal bus 11 may be applied to the cable after traversing suitable impedance matching circuitry in subsurface output stage 12. Also, the use of an amplitude or frequency modulated carrier wave to convey the data uphole has been described earlier in the specification.

In order to expedite the understanding of the switching and gating sequence of the four channel subsurface system shown in FIGURE 1, the following tabular schedule is set forth.

|  | Original Assumed Conditions | First Pulse | Second Pulse | Third Pulse | Fourth Pulse |
|---|---|---|---|---|---|
| Conducting Anodes, V3, V5 | A and C. | B and D. | A and D. | B and C. | A and C. |
| Non-Conducting Dual Diodes | V6 | V8 | V9 | V7 | V6. |
| Ionized Gas Diodes | V10 | V12 | V13 | V11 | V10. |
| Conducting Pentode | V14 | V15 | V16 | V17 | V14. |
| Conducting Channel | No. 1 | No. 2 | No. 3 | No. 4 | No. 1. |

DETAILED DESCRIPTION OF FOUR CHANNEL SURFACE CIRCUITRY AND INSTRUMENTATION

Figures 2A, 2B:
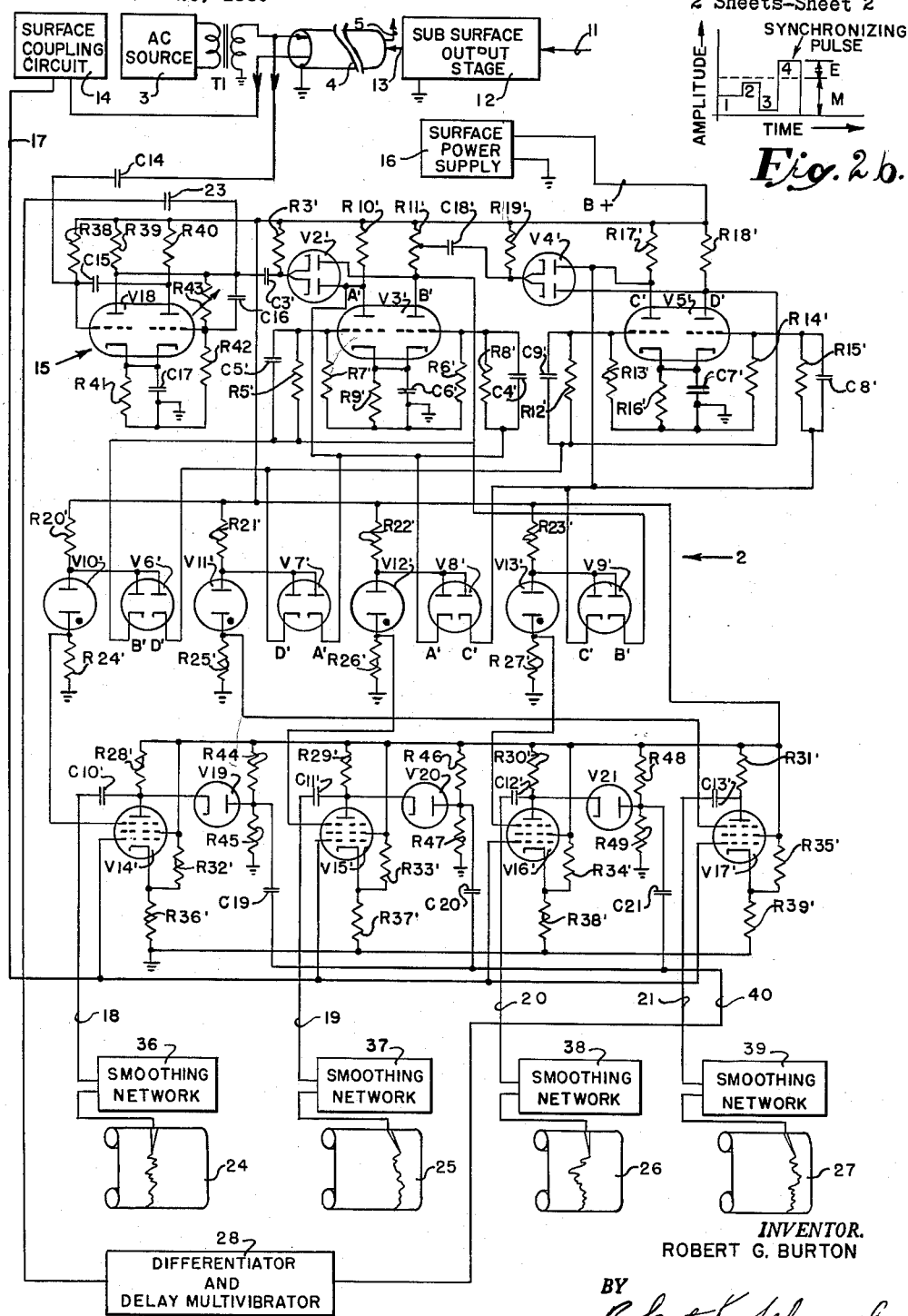
FIGURE 2a shows schematically the circuitry and instrumentation of a four channel surface system adapted to receive information and run in synchronism with the subsurface system shown in FIGURE 1.
FIGURE 2b shows the relative magnitude of the synchronizing pulses and the signals traveling in the various channels of the four channel system.

Turning now to FIGURE 2a, the numeral 2 indicates generally the surface circuitry and instrumentation which is employed in conjunction with the subsurface apparatus shown in FIGURE 1. The outgoing signal bus 11 depicted in the upper right hand corner of FIGURE 2 is part of the subsurface circuitry of FIG. 1 and, as described above, feeds the successive signals from subsurface pentodes V14, V15, V16 and V17 into the subsurface output stage 12. After traversing the requisite impedance matching circuitry in output stage 12, or after super-position on a suitable carrier which is generated therewithin, the data is conveyed uphole over cable 4. As earlier stated, the conductor 5 may be employed to convey the data uphole, in order to provide a single conductor system or, if desired, a separate conductor 13 may be employed, as shown.

At the surface, the data which is transmitted uphole is applied to the surface coupling circuit 14. Unit 14, which is generically designated as the surface coupling circuit herein, may comprise suitable equipment for matching the cable impedance to the input impedance of the subsequent stages of surface circuitry. Moreover, where subsurface data has been used to frequency or amplitude modulate a carrier frequency, the surface coupling circuit 14 may include suitable equipment for demodulating the carrier or otherwise recovering the electrical data implicitly superimposed thereupon. Where frequency modulation has been employed, the circuit 14 may include suitable limiters and discriminators which recover the original modulating signal delivered to the subsurface output stage 12 via outgoing signal bus 11. Additionally, the surface coupling circuit 14 may include such conventional amplifier stages, wave filters, and other circuits as prove necessary or desirable, and it will be appreciated that the specific configuration of the circuits contained therein form no part of the present invention.

Continuing with the detailed description of FIGURE 2, the alternating current source 3 which is used to supply the alternating voltage to the subsurface circuitry over cable 4, is connected to actuate simultaneously the trigger delay multivibrator 15.

The delay multivibrator 15 operates to delay the trigger pulses applied thereto for an interval approximately equal to the travel time of a pulse down the conductor 5 and back again. The switching sequence which gates the surface Channels 1, 2, 3 and 4 is thus slightly delayed by the unit 15 in order to compensate for the travel time of the pulses along the cable. The net effect of this delay is to apply positive gate potentials to the suppressor grids of the surface pentodes at substantially the instant of arrival of the downhole signals at the surface pentode control grids.

More particularly, when a trigger pulse is applied through capacitor C14 to the control grid of the dual triode V18, which is connected in a conventional delay multivibrator circuit as indicated by the numeral 15, a pulse is generated across anode load resistor R39. This pulse is differentiated by capacitor C3' and resistor R3'. The negative pulse corresponding to the trailing edge of the pulse across R39 is fed through dual diode V2' and triggers bistable multivibrator V3'. Hence, V3' is triggered later than multivibrator 15 by an amount equal to the duration of the pulse generated by multivibrator 15. Referring again to multivibrator 15, resistor R41 is connected from both cathodes of V18 to ground. Resistor R41 is by-passed by capacitor C17. This combination keeps the cathodes of V18 at a relatively constant potential above ground. The left and right anodes of V18 are connected to the B-plus supply voltage through resistors R39 and R40, respectively. The left hand anode of V18 is coupled to the right hand grid through resistors R43, R42 and capacitor C16. The right hand anode is coupled to the left hand grid through capacitor C15 and resistor R38. By properly proportioning the values of resistances and capacitances it is possible to make the output pulse across R39 of any desired duration.

It will be observed that the dual triodes V3' and V5' connected as bistable multivibrators beyond the dual diode V2' are connected in substantially the same manner as were the multivibrators V3 and V5 disclosed in FIGURE 1.

In other words, the receipt of four successive pulses, via delay multivibrator 15 causes the dual triodes V3' and V5' to progress through four successive conditions or stages of operation, finally reverting on the fourth pulse to the original condition.

The cathodes of the four dual diodes V6', V7', V8' and V9' are connected to the anodes A', B', C' and D' exactly as described in FIGURE 1 in connection with diodes V6, V7, V8 and V9.

From an original state in which conduction occurs in the left triode section of each of the dual triodes V3' and V5', the sequence in which the cathode potentials of dual diodes V6', V7', V8' and V9' change is exactly as described in connection with FIGURE 1.

It will be recalled that receipt of the successive impulses in the subsurface circuit of FIGURE 1 caused the dual diodes in that circuit to become non-conductive in the order V6, V8, V9 and V7. This causes the ionization of the associated gas diodes in the order V10, V12, V13 and V11, and successively applies a positive gating potential to the pentodes V14, V15, V16 and V17. This resulted in successively providing positive gate voltages to the pentodes in Channel 1, Channel 2, Channel 3 and Channel 4 for delivery to the surface.

In the surface circuitry shown in FIGURE 2, the dual diodes become non-conductive in the order V6', V8', V9' and V7'. The surface pentodes will then be gated in the order V14', V15', V16' and V17' in the manner described in FIGURE 1. It will be observed that the gating sequence for the surface pentodes is the same as the gating sequence for the subsurface pentodes.

This effectively provides a conductive channel from each subsurface detector to whichever surface recorder is recording the value of the particular subsurface variable. The manner in which the surface recorders are operated to insure substantially continuous recording of a given variable will now be explained. The pentode V14' in FIGURE 2 controls the transmission of signals in the surface Channel No. 1. This tube is provided with a diode V19 and a resistor R45 connected in series between its anode and ground. The cathode of V19 is connected directly to the anode of V14', and the anode of V19 is coupled through resistor R45 to ground potential. Resistor R44 is interconnected between the B-plus supply and the anode of the diode V19.

In Channel No. 2, B-plus is applied via resistor R46 to the anode of diode V20, and the cathode of the tube is coupled directly to the anode of V15'. Resistor R47 is interconnected between the anode of V20 and ground.

In Channel No. 3, B-plus is applied via resistor R48 to the anode of diode V21. The cathode of V21 is connected directly to the anode of V16' and resistor R49 is interconnected between the anode of V21 and ground.

In Channel No. 4, which employs the pentode V17', no such diode circuit is included for reasons which will become clear as the description proceeds.

The control grids of each of the surface pentodes V14', V15', V16' and V17' are connected to the surface coupling unit 14, by means of the input signal bus 17. The output signals from the individual pentodes V14', V15', V16' and V17' are coupled by means of suitable coupling capacitors C10', C11', C12' and C13' to the conductors 18, 19, 20 and 21, respectively. These conductors lead through appropriate smoothing networks 36, 37, 38, 39 to recorders 24, 25, 26, 27. The nature of the smoothing networks will depend on the characteristics of the recorders and serve to enhance the quality of presentation. They may comprise conventional RC integrating networks.

If by chance the surface gating sequence should get out of step with the subsurface gating sequence due to false triggering of any "flip-flop" then it is obvious that the synchronizing pulse signal will appear at the anode of one of the gate tubes V14', V15', or V16'. This pulse is sufficiently large that it will overcome the bias on the diode V19, V20, or V21 and cause conduction therethrough. This will cause a pulse of voltage on lead 40 (across resistor R45 or R47 or R49), which can be differentiated and delayed if necessary by differentiator and delay multivibrator 28 and fed back through capacitor 23 to the input of the "flip-flop" system comprising V2', V3' and associated circuitry. It is now apparent that if the synchronizing pulse appears in the wrong channel it serves to generate a pulse which in effect steps the switching sequence ahead by one cycle. This process occurs and reoccurs until the synchronizing pulse is returned to the correct channel.

In concluding the portion of the specification dealing with the four channel system, it will be seen that this aspect of my invention comprises a novel means for gathering and transmitting data on four variables to the surface, and that means have further been provided for assuring substantial continuity in the recording of such variables. It is to be understood that the explanation of the switching and gating sequence is purely illustrative, and that any subsurface characteristics of interest may be sampled and applied as electrical signals to the subsurface pentodes. Moreover, it is to be understood that the term "recorder" is used generically herein to encompass any suitable type of device adapted to reflect the variations in the subsurface variables with depth, and that the invention is not limited to any specific form of recorder.

It should now be apparent to one skilled in the art that the principle of operation of the four channel system can be extended to give an eight channel system (or sixteen, or thirty-two, etc.). Since the eight channel system functions in the same manner as the four channel system described above, a detailed description of the eight channel system will not be given.

In concluding the specification of the invention as a whole, it is to be understood that individual triodes may be used in place of the dual triodes described herein and that individual diodes may be employed in place of the various dual diodes and triple diodes. It is to be noted that the systems taught herein are completely bilateral and that signals developed on the surface can be transmitted to the down-hole circuits. The alternating current source which is used to supply the triggering voltages may be located in proximity to the down-hole circuitry, rather than at the surface. Moreover, conventional sources of D.C. may be employed to provide the anode and filament power to the down-hole circuitry, if desired, and the rectification of the alternating current triggering voltage for this purpose is not absolutely necessary to the successful practice of the invention.

It is also to be understood the sequentially gated surface and subsurface space discharge devices are not restricted to pentodes and that the use of tetrode tubes falls equally within the purview of the invention. Moreover, the gaseous diodes employed herein may be replaced by non-linear impedances, or semi-conductor devices, which remains substantially non-conductive below a predetermined voltage and become conductive at voltages above the predetermined level. Because of the space limitations which characterize well logging instruments, it is to be appreciated that the invention is not limited to plural element space discharge devices which require an incandescent element to provide a supply of electrons. Rather, the invention contemplates the compact packaging of components and small power requirements made possible by transistorized operation. For this reason, the replacement of any or all of the plural element vacuum tubes described herein with transistors is deemed to involve the use of a resonable equivalent. It is to be further appreciated that the explanation of my plural channel multiplex systems in a well logging environment has been for illustrative purposes only and not by way of limitation and that other applications of my invention are deemed to fall fairly within the spirit and scope of the claims appended hereto.

While, therefore, I have clearly disclosed my invention in compliance with the terms of the statute, it will be readily apparent that many modifications, substitutions and alterations can be made therein without departing in any manner from the spirit and scope of the invention as defined in the appended claims.

What I claim is:

1. In a plural channel multiplex system adapted for subsurface surveying, a plurality of multivibrators connected to receive a succession of triggering impulses and adopt a series of distinct states of conductivity in response thereto, a plurality of plural element diodes provided with common anode connections and connected to become cyclically completely non-conductive in response to the conductivity states of said multivibrators, a gas diode and resistor connected in shunt between the common anodes of each diode and ground, a group of normally non-conductive pentodes each connected to receive a sequential gating pulse when one of said gas diodes is in an ionized conduction, means connected to supply operating potential to said multivibrators, said diodes and said pentodes, and a subsurface output stage connected to receive an output signal from each of said pentodes during the application of said gating pulse thereto.

2. In a four channel well logging system for obtaining data on a plurality of subsurface variables; a pair of dual triodes provided respectively with first, second, third and fourth anode elements, and connected as bistable multivibrators; means connected to switch said dual triodes through four successive states during which different pairs of anodes conduct current; four dual diodes each provided with respective common anode connections and a pair of cathode elements; means conductively interconnecting one cathode from the second and third of said dual diodes to form a first common junction therebetween; means conductively interconnecting one cathode from the first and fourth of said dual diodes to form a second common junction therebetween; means conductively interconnecting one cathode from the third and fourth of said dual diodes to form a third common junction therebetween; means conductively interconnecting one cathode from the first and second of said dual diodes to form a fourth common junction therebetween; means electrically connecting the first, second, third, and fourth anode elements of said dual triodes to said first, second, third and fourth common junctions, respectively; a respective series-connected resistor and gas diode network coupled between the common anode connection of each of said dual diodes and ground; four normally non-conductive plural element space discharge devices, each having an element thereof connected between one of said gas diodes and said series-connected resistors to receive a positive gating signal therefrom; means connected to supply operating potentials to said dual triodes, said dual diodes, and said space discharge devices; and a subsurface output stage connected to receive an output signal from each of said space discharge devices during the conductive interval thereof.

3. In a four channel well logging multiplex system adapted for sampling a plurality of subsurface variables, a pair of dual triodes connected as bistable multivibrators and adapted to assume four successive stages of conduction in response to receipt of four successive electrical impulses; an alternating current source connected to supply a timed series of electrical impulses to said bistable multivibrators; a first, a second, a third and a fourth dual diode each provided with a common plate connection; means connecting a cathode of said first and fourth dual diodes to the right anode of the first of said dual triodes; means connecting a cathode of said second dual diode and the other cathode of said first dual diode to the right anode of said second dual triode; means connecting a cathode of said third dual diode and the other cathode of said second dual diode to the left anode of said first dual triode; means connecting a cathode of said fourth dual diode and the other cathode of said third dual diode to the left anode of said second dual triode; four normally non-conductive plural element space discharge devices; means coupling the common plate connection of each of said dual diodes to an element of one of said space discharge devices, said coupling means being non-conductive except when said dual diode is completely non-conductive; a power supply connected to supply anode potential to said dual triodes, said dual diodes, and said space discharge devices; and a subsurface output stage connected to receive a signal from each of said space discharge devices in turn.

4. A well logging system having subsurface apparatus providing a plurality of signal channels each having a detector for developing an electrical information signal related to a particular subsurface measurement and gating means for passing information signals when open; surface apparatus providing a plurality of corresponding signal channels each having recording means and gating means for passing signals to said recording means when open; a cable including a common signal transmission circuit for transmitting signals for all channels between said surface and subsurface apparatus; a source of timing signals; and means for applying timing signals from said source to said surface and subsurface apparatus to operate corresponding gating means; said subsurface apparatus comprising a plurality of bistable devices in series and operated by an incoming timing signal to change the operating state of said plurality of devices, a plurality of diodes in each of said channels connected to develop an output signal only when all of said diodes are non-conducting and connected to respective stages of said bistable devices so that all of the diodes of each channel are non-conducting upon a respective unique state of said plurality of bistable devices, means responsive to said developed signal for opening the gating means of a channel to pass said information signal from a respective detector, and means for developing a characteristic synchronizing signal in one of said channels; said surface apparatus comprising a plurality of bistable devices in series and operated by an incoming signal to change the operating state of said plurality of devices, a plurality of diodes in each of said channels connected to develop an output signal only when all of said diodes are non-conducting and connected to respective stages of said bistable devices so that all of the diodes of each channel are non-conducting upon a respective unique state of said plurality of bistable devices, means responsive to said developed signal for opening the gating means of a channel to pass signals to a respective recording means, and means responsive to said characteristic synchronizing signal for maintaining synchronism between respective surface and subsurface channels so that a particular detector is substantially always associated with the same recording means.

5. In well logging, a system for transmitting a plurality of signals, said system having subsurface apparatus providing a plurality of signal channels each having gating means for passing signals when open, surface apparatus providing a plurality of corresponding signal channels each having gating means for passing signals when open, a source of timing signals at the surface apparatus, a cable including a common signal transmission circuit for transmitting signals for all channels between said surface and subsurface apparatus, means for applying timing signals from said source to said cable for transmission to said subsurface apparatus to operate gating means therein, and delay means for applying timing signals from said source to said surface apparatus to operate corresponding gating means after a delay equal to the time required for a timing signal to be transmitted down said cable and for an information signal to be transmitted up said cable, said surface and subsurface apparatus comprising a plurality of bistable devices in series and operated by an incoming timing signal to change the operating state of said plurality of devices, and means connected to respective stages of said bistable devices to open the gating means of a channel upon a respective unique state of said plurality of bistable devices.

6. In well logging, a system for transmitting a plurality of signals, said system having subsurface apparatus providing a plurality of signal channels each having gating means for passing signals when open, surface apparatus providing a plurality of corresponding signal channels each having gating means for passing signals when open, a source of timing signals, and means for applying timing signals from said source to said surface and subsurface apparatus to operate corresponding gating means, said surface and subsurface apparatus each comprising a plurality of bistable devices in series and operated by an incoming timing signal to change the operating state of said plurality of devices, a plurality of diodes for each of said channels connected to provide a non-conducting path only when all of said diodes are non-conducting and connected to respective stages of said bistable devices so that all of the diodes of each channel become non-conducting upon a respective unique state of said plurality of bistable devices, and means for opening the gating means of a channel only when all of said diodes in said channel are non-conducting.

7. In well logging, a system for transmitting a plurality of signals, said system having subsurface apparatus providing a plurality of signal channels each having gating means for passing signals when open, surface apparatus providing a plurality of corresponding signal channels each having gating means for passing signals when open, a source of timing signals, means for applying timing signals from said source to said surface and subsurface apparatus to operate said gating means, synchronizing means for causing said timing signals to operate surface and subsurface gating means of the corresponding channels together, and common signal transmission means for transmitting signals for all channels between said surface and subsurface apparatus, said surface and subsurface apparatus each comprising a plurality of bistable devices in series and operated by an incoming timing signal to change the operating state of said plurality of devices, and means connected to respective stages of said bistable devices to open the gating means of said channels in a predetermined sequence in response to unique states of said plurality of bistable devices.

8. In well logging, a system for transmitting a plurality of signals, said system having subsurface apparatus providing a plurality of signal channels each having gating means for passing signals when open, surface apparatus providing a plurality of corresponding signal channels each having gating means for passing signals when open, a source of timing signals, and means for applying timing signals from said source to said surface and subsurface apparatus to operate said gating means, said surface and subsurface apparatus each comprising a plurality of bistable devices in series and operated by an incoming timing signal to change the operating state of said plurality of devices, and means connected to respective stages of said bistable devices to open the gating means of a channel upon a respective unique state of said plurality of bistable devices.

9. In well logging, a system for transmitting a plurality of signals, said system having subsurface apparatus providing a plurality of signal channels each having gating means for passing signals when open, surface apparatus providing a plurality of corresponding signal channels each having gating means for passing signals when open, a source of timing signals, and means for applying timing signals from said source to said surface and subsurface apparatus to operate corresponding gating means, said surface and subsurface apparatus each comprising a plurality of bistable devices in series and operated by an incoming timing signal to change the operating state of said plurality of devices, a plurality of diodes in each of said channels connected to develop an output signal only when all of said diodes are non-conducting and connected to respective stages of said bistable devices so that all of the diodes of each channel are non-conducting upon a respective unique state of said plurality of bistable devices, and means for opening the gating means of a channel in response to said developed signal.

10. In an electronic multiplex system adapted for subsurface surveying and having signalling means including a group of subsurface space discharge devices for delivering electrical data on a plurality of variables to the surface; the improvement in combination therewith comprising distributor means including a pair of dual triodes connected as bistable multivibrators and provided with four anodes; means connected to deliver a series of pulses to said multivibrators to cause different pairs of said anodes to conduct in sequence; a plurality of dual diodes each having a common plate connection, the cathodes of the first of said diodes connected to the second and fourth anodes of said multivibrators, the cathodes of the second diode connected to the first and fourth anodes of said multivibrators, the cathodes of the third diode connected to the first and third anodes of said multivibrators, and the cathodes of the fourth diode connected to the second and third anodes of said multivibrators; a plurality of normally non-conductive plural element space discharge devices connected each to receive and amplify an input signal from said signalling means; and means connected to provide a positive gate voltage to one of said space discharge devices only when one of said dual diodes is completely non-conductive.

References Cited in the file of this patent

UNITED STATES PATENTS

| | | |
|---|---|---|
| 2,048,081 | Riggs | July 21, 1936 |
| 2,154,886 | Bachelet | Apr. 18, 1939 |
| 2,850,723 | McNaney | Sept. 2, 1958 |